Aug. 23, 1955
A. G. PINCUS
2,716,069
FLUOROXIDE GLASS COMPOSITION
Filed July 27, 1948
3 Sheets-Sheet 1
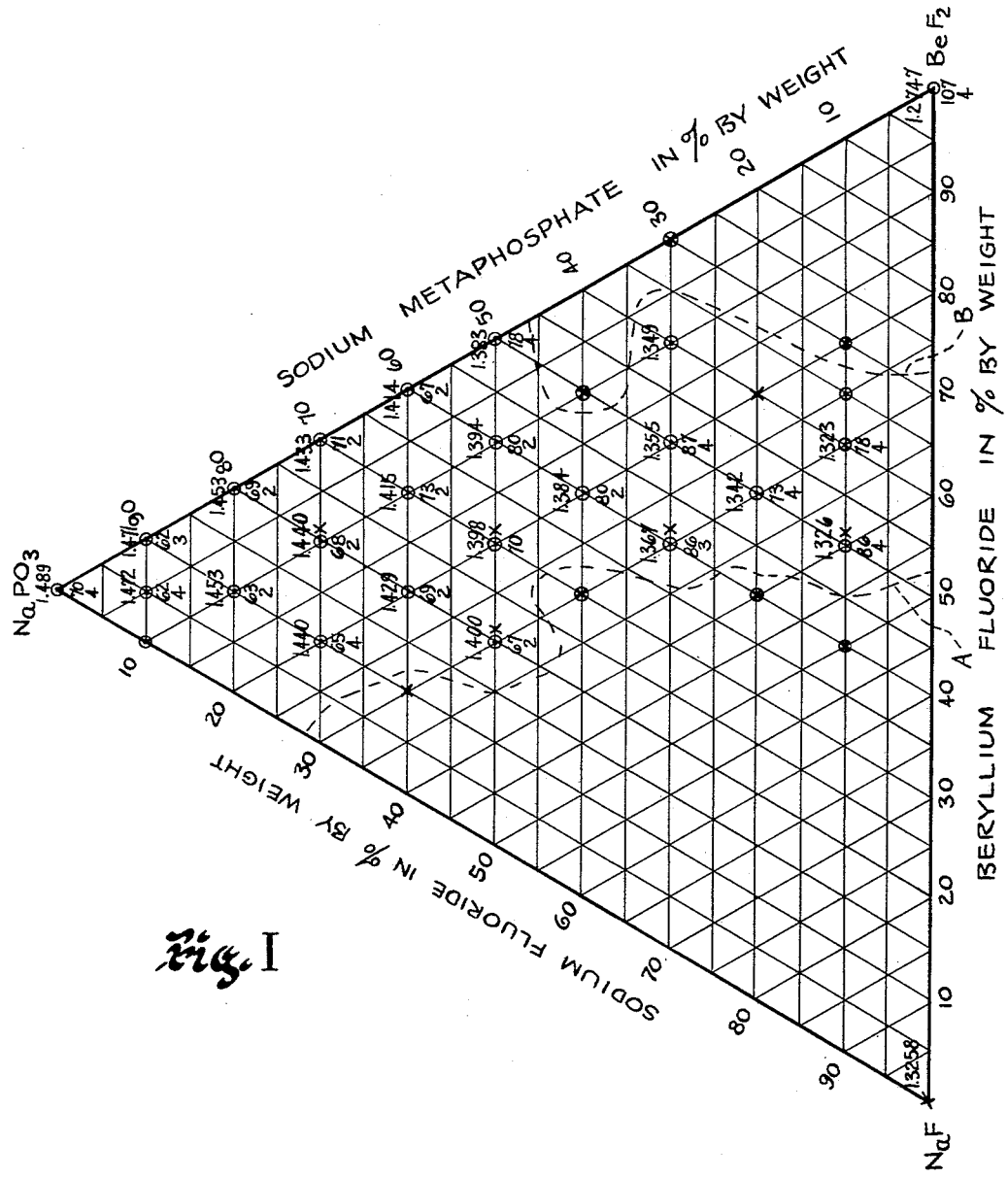
Fig. I
INVENTOR.
ALEXIS G. PINCUS
BY
*Louis L. Gagnon*
ATTORNEY

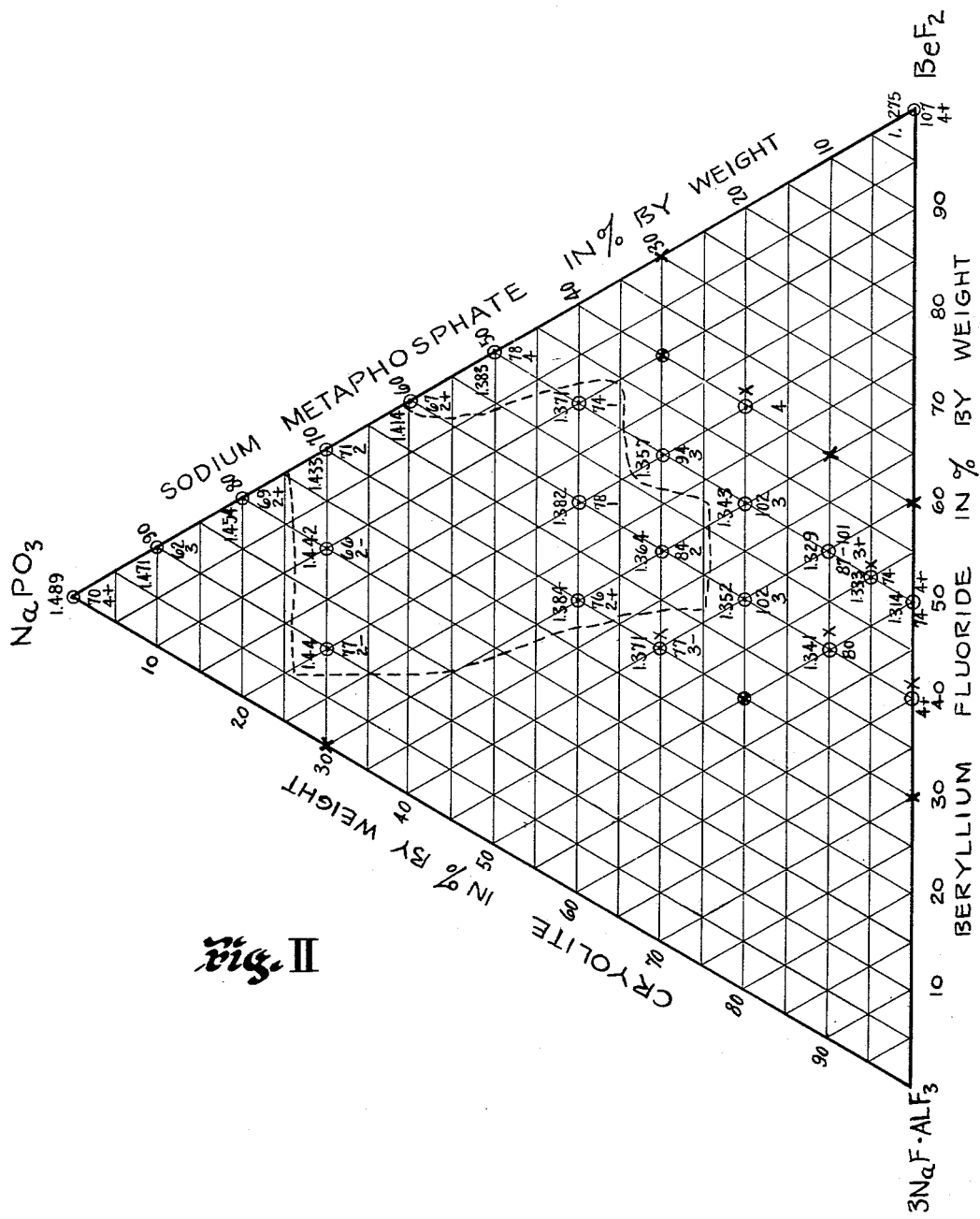
Fig. II
INVENTOR.
ALEXIS G. PINCUS

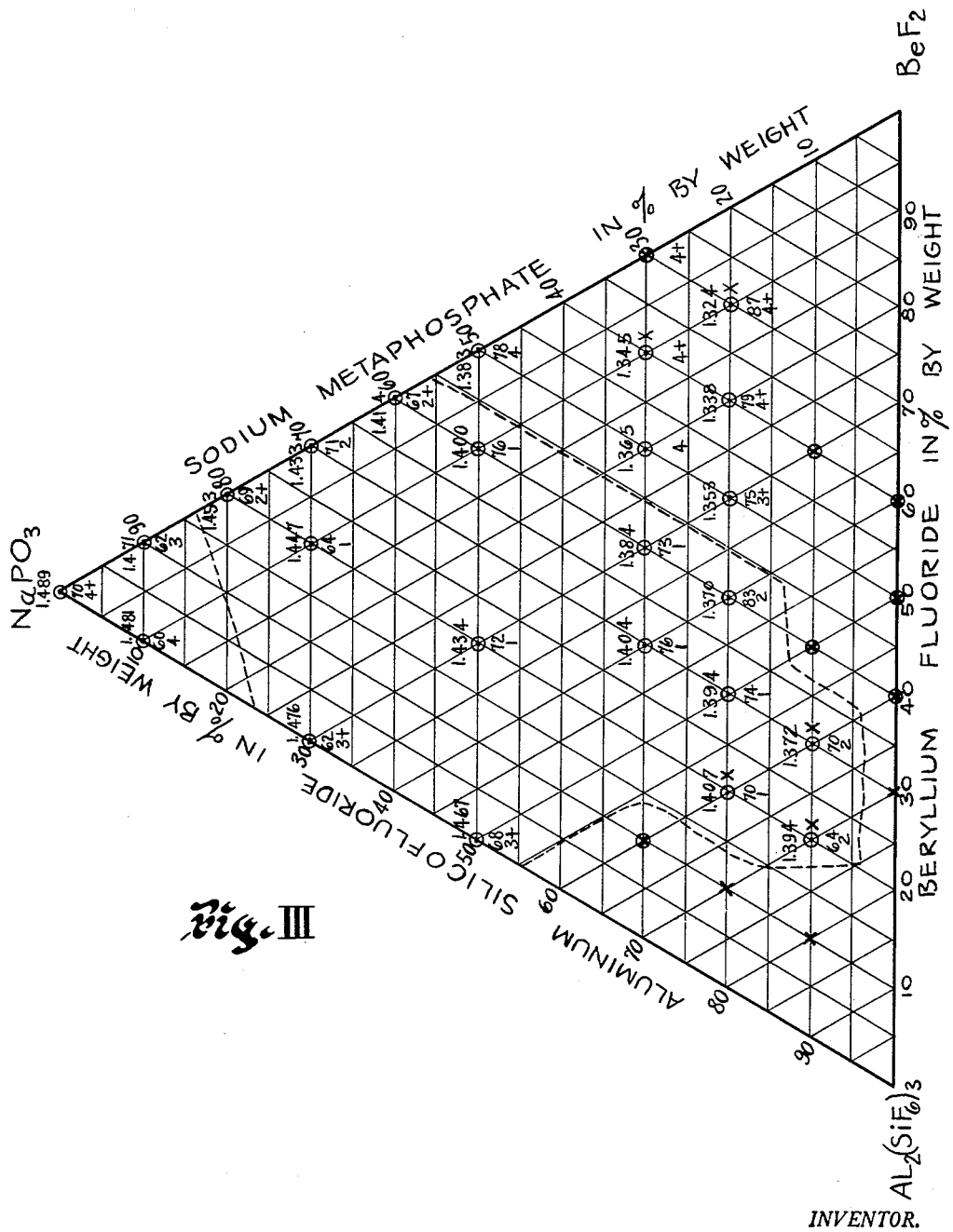
Fig. III

2,716,069

FLUOROXIDE GLASS COMPOSITION

Alexis G. Pincus, Worcester, Mass., assignor to American Optical Company, Southbridge, Mass., a voluntary association of Massachusetts Application July 27, 1948, Serial No. 40,963

11 Claims. (Cl. 106—47)

This invention relates to glass compositions and has particular reference to glasses which have a low index of refraction and a low or controllable optical dispersion and process of making the same.

One of the principal objects of the invention is to provide glasses whose index of refraction is considerably below known commercial glasses, whose index of refraction and reciprocal relative dispersion properties may be varied with respect to each other over a broader range than has heretofore been available, whose chemical durability will be adequate to meet the requirements of particular uses, and which are readily workable and afford ease of fabrication and refabrication.

Another object is to provide glasses of the above nature which may be melted and worked at very low temperatures lying in the region between known commercial glasses and organic plastics and process of making the same.

Another object is to provide glasses of the above nature whose indices of refraction may be more positively controlled and over a wider range than known commercial glasses.

Another object is to provide glasses of the above nature whose dispersive properties may be more positively controlled and over a wider range than known commercial glasses.

Another object is to provide glasses of the above nature which include as essential ingredients fluorine and oxygen in varying ratios as anions combined with selected positive elements as cations in controlled related proportions depending upon the resultant characteristics desired.

Another object is to provide fluoroxide glasses of the above nature in which the fluorine is derived from fluorides of metallic elements such as beryllium, aluminum, zirconium, titanium, silicon, analogous polyvalent fluorides and combined with fluorides of univalent and bivalent metallic elements such as sodium, potassium, lithium, magnesium, calcium, strontium, barium, zinc, cadmium, lead, etc. and in which the oxygen is derived from the oxides of non-metallic positive elements such as phosphorous, nitrogen, carbon and the like.

Another object is to provide glasses of the above nature which include, as an essential ingredient thereof, beryllium fluoride.

Another object is to provide glasses of the above nature which are formed from blends of metaphosphates with beryllium fluoride and other metal fluorides.

Another object is to provide glasses of the above nature having silicofluorides (fluosilicates) as major constituents.

Another object is to provide glasses of the above nature having aluminum silicofluoride as a major constituent which aluminum silicofluoride can partially or completely replace the beryllium fluoride.

Another object is to provide glasses of the above nature having a wider range of relative proportions of network forming and non-network-forming cations and a wider range of anions than has hiterto been available.

Another object is to provide glasses of the above nature which may be controlled as to the kinds and relative proportions of anionic constituents present for desired control of dielectric and optical properties.

Another object is to provide glasses of the above character which utilize as fully as possible available and relatively economical raw materials.

Another object is to provide glasses of the above nature possessing characteristics which make possible new fabricating techniques and new applications in coatings, impregnants, cements, enamels, glazes, etc.

Another object is to provide novel processes of obtaining all of the above objects and advantages.

Other objects and advantages of the present invention will become apparent from the following description taken in connection with the accompanying drawings and it will be apparent that many changes may be made in the compositions and processes set forth herein without departing from the spirit of the invention as expressed in the accompanying claims. I, therefore, do not wish to be limited to the exact compositions and processes disclosed as the preferred forms only have been given by way of illustration.

Some glasses possessing the characteristics set forth herein are known in the art but such known prior art glasses did not possess sufficient resistance to weathering and ease of fabrication and refabrication to render them commercially practical. Some suggestions were made of the possibilities in beryllium fluoride glasses from theoretical reasoning by V. M. Goldschmidt and very limited research was conducted in the field of berryllium fluoride glasses by Dr. George Heyne but neither in any way achieved or taught the broad scope or findings and results obtained by the present invention. Heyne's contribution to the art merely included glasses which he stated were not stable 'for practical applications, especially in optics . . . The Beryllium fluoride glasses must, where remaining clear for a long time is required, be protected from moist air or embedded in suitable material." Glasses of the teachings of the present invention do not require this protection and also, in certain compositions taught, are more durable than many glasses which are commonly used in optical applications.

Such known prior art berylium fluoride glasses embodied compositions utilizing a high proportion of relatively expensive ingredients and failed, in general, to provide the art with any definite knowledge as to control of refractive indices and dispersive properties and at most embodied a very narrow range of compositions as compared with the present invention and offered little, if anything, of commercial interest.

Attempts have also been made to produce lowered refractive index and dispersion by introducing fluorine into an alkali borosilicate base, free from bivalent oxides, resulting in the optical fluor-crowns containing up to about 7% fluorine by weight. These glasses did not provide a refractive index lower than about 1.45. Their dispersion has been tied closely to the index and could not be varied much from V=67. Compared to the glasses of the present invention they are difficult to melt, give poor quality yields, and are of inferior chemical durability.

Glasses of the present invention open an entirely new field of research as to optical systems and lens design in general and lend themselves to several different applications. For examples of particular uses: such glasses may replace crystals in highly corrected lens systems; may be used as an intermediate medium for supporting the elements of different lens systems in more positive relation with each other and at the same time replace the conventional air spaces of the elements of such systems with a less abrupt interfacial transition in refractive indices; and will afford other design possibilities which can take advantage of their unique optical characteristics.

The invention is directed particularly to the combining of BeF₂ (beryllium fluoride) or equivalent substituents, (PO₃)⁻ (the metaphosphate radical) or equivalent substituents, and R⁺ (an ingredient or ingredients of the metallic cations group) in such a manner as to obtain glasses having low or variable and controllable indices of refraction, low or variable and controllable optical dispersions, controlled as to stability and resistance to chemical attack and weathering, controllable characteristics as to melting and softening properties, introducing ease of fabrication and possessing practical working and remelting characteristics.

Another method of describing the possible constituents and their relative proportions is by the generalized formula:

$$A_m B_n (O_x F_{1-x})$$

where A represents the "hole-filling or non-network-forming" cations which may be sodium (Na+), potassium (K+), magnesium (Mg²⁺), calcium (Ca²⁺) barium (Ba²⁺), zinc (Zn²⁺), lithium (Li⁺), rubidium (Rb⁺), caesium (Cs⁺), cadmium (Cd²⁺), lead (Pb²⁺), thallium (Tl¹⁺) and (Tl²⁺), strontium (Sr²⁺) or the like;

B represents the network-forming cations of the type Beryllium (Be⁺⁺), aluminum (Al³⁺), silicon (Si⁴⁺), zirconium (Zr⁴⁺), phosphorous (P⁵⁺), boron (B³⁺), sulphur (S⁶⁺), nitrogen (N⁵⁺), carbon (C⁴⁺), titanium (Ti⁴⁺), or the like. It is understood that certain cations, such as aluminum (Al³⁺) are able to function as both hole-fillers and network-formers depending on the chemical balance among the remaining ions;

O represents the oxygen anion, O²⁻;

F represents the fluorine anion, F⁻.

In this generalized formula the sum of the anions present is always taken as unity and the relative proportions of cations present refer to the unit anion. Thus, if fluorine is the only anion it will be given the subscript unity. Where both fluorine and oxygen are present, the fluorine will differ from unity by the proportion $x$ of oxygen present and the fluorine will have the subscription $1-x$ resulting from subtracting the number represented by $x$ from unity. If other anions such as chlorine, bromine or sulphur are introduced, they will be included in the total within the parenthesis, but the sum of the anions will still be reduced to unity.

The subscripts $m$ and $n$, respectively, indicate the relative numbers of ions of type A and type B per unit anion.

Examples:

I. Beryllium fluoride (BeF₂) glass would be expressed as Be₀.₅F. 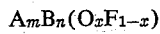

II. A useful glass composition has been found to be made from the batch:

| | Per cent |
|---|---|
| Beryllium fluoride | 40 |
| Cryolite | 40 |
| Sodium metaphosphate | 20 | it is to be understood that in this formula or wherever referred to herein, the metaphosphate of sodium can be replaced partially or entirely by other known glass-forming metaphosphates such as aluminium, potassium, zinc, calcium, beryllium or the like.

Its formula would be expressed as:

$$Na_{0.22}(Be_{0.25}Al_{0.06}P_{0.06})_{0.37}(O_{0.17}F_{0.83})$$

III. Practical substitutions include:

For Na—Li, K, Rb, Cs completely Ba, Sr, Ca, Mg, Zn, Cd, Pb, Bi, Tl, etc. partially.

For Be—the minimum is determined by the proportion of fluorine present and Be can be partially replaced by Al, B, Si, Ti, Zr, C, N, P, S, etc.

By the use of aluminum silicofluoride certain composition regions have been discovered in which the Be can be completely replaced and still obtain glasses having similar characteristics to those set forth above.

O, Cl, Br, I, (OH)⁻, etc. may be combined with F if desired.

The phosphorus cation P⁵⁺ has been found to be a particularly useful member of the B group because it brings about a compatibility between oxygen and fluorine anions which greatly promotes glass-forming tendencies and inhibits crystallization or devitrification.

Also within the B group it has been found possible to replace some of the phosphorous cations (P⁵⁺) with nitrogen (N⁵⁺) and carbon (C⁴⁺), with marked improvement in chemical durability of the glasses and unusual optical positions resulting.

By this form of representation the invention is directed particularly to the combining of "B" network-forming cations with sufficient "A" non-network forming cations to assure homogeneous vitreous characteristics and with balanced proportions of fluorine and oxygen (and other anions such as mentioned above) in such a manner as to obtain true homogeneous glasses having low or variable and controllable indices of refraction, low or variable and controllable optical dispersions, controlled as to stability and resistance to chemical attack and weathering, controllable characteristics as to melting and softening properties, introducing ease of fabrication and possessing practical working and remelting characteristics.

Referring to the drawings:

Fig. I is a triaxial diagram illustrating glass formation in the field NaF, BeF₂ and NaPO₃ and giving the refractive index and Nu(V) value of the resulting glasses;

Fig. II is a similar triaxial diagram illustrating glass formation in the field cryolite (3NaF.AlF₃), beryllium fluoride (BeF₂) and sodium metaphosphate (NaPO₃) and the refractive index and Nu(V) value of the resulting glasses;

Fig. III is a triaxial diagram illustrating glass formation in the field aluminum silicofluoride (Al₂(SiF₆)₃) beryllium fluoride (BeF₂) and sodium metaphosphate (NaPO₃).

In the figures set forth above a marking code has been used to indicate the melting characteristics of the batches given. This marking code is as follows:

⊙ (Dot within a circle) indicates that a clear glass can be obtained without special precautions or deviations from a normal melting, pouring and cooling cycle.

⊙ × (A cross beside the circle) indicates that scattered crystals were obtained within the clear glass. As is well known these may often be avoided by minor changes in the melting procedures but would introduce more positive control and more difficult procedure.

⊕ (Cross within a circle) indicates that the specimen was still vitreous in nature but contained enough crystals to cause an opalescent, opal or alabaster appearance. As is well known this difficulty could be avoided and clear glass could be obtained by extreme quenching but again would introduce even greater difficulty in fabrication. The ⊙ therefore indicates the most desirable batches which may be formed with the usual ease of fabrication desired.

× (Cross alone) indicates that the composition was non-vitreous in its behavior during heating, or cooled to an opaque, fragile mass, predominately crystalline and free from glass and is very undesirable.

The figures above the ⊙ indicate the index of refraction of that particular batch and the figures immediately below the ⊙ indicate the Nu value (V) and the number immediately below that indicates an arbitrary rating for chemical durability.

In the disclosure set forth above the characteristics listed have been assessed by:

Refractive index and dispersion (Nu value) by measurements with an Abbe refractometer on polished faces. The specimens were annealed to remove most of the mechanical strain, but were not "fine-annealed" or "compacted" to maximum and uniform index. It is well known that refractive index values shift with the refinement of annealing approaching maximum value with prolonged annealing at the proper cooling rate. Dispersion values would similarly be sensitive to heat treatment. The values given herein, however, are indicative of the order of magnitude of the actual values and are of the type usually relied upon in determining such values to a first approximation.

Chemical durability was rated by appearance of the specimens immediately after polishing and then again after a few months storage in paper envelopes in the laboratory atmosphere.

On the triaxial diagrams given:

4 indicates a hygroscopic glass, similar to beryllium fluoride,
3 indicates that the surface formed a white film,
2 indicates that the surface stained,
1 indicates that the surface and the specimen retained its polish and brightness comparable to commercial optical glasses and are considered to possess good durability,
+ Added to the number increases the value, indicating poorer durability, and
− Added to the number indicates better durability.

Melting and working procedures and their evaluation will be discussed more in detail later in the specification.

Referring more particularly to Fig. I it is particularly pointed out that the glasses referred to therein comprise selected proportions of sodium fluoride, sodium metaphosphate and beryllium fluoride. The various glasses resulting from the combining of the above three ingredients were measured for index of refraction, Nu value and durability and the values obtained are noted on the diagram.

Pure beryllium fluoride ($BeF_2$) glass has been found to possess extraordinarily low refractive index and optical dispersion. These properties have been found to be as follows:

$$N_D\text{—}1.27475$$
$$N_F\text{—}1.27649$$
$$N_C\text{—}1.27392$$
$$V=\frac{N_D-1}{N_F-N_C}=107.$$
$$R=\frac{N_D-N_C}{N_F-N_C}=0.322$$

Unfortunately for its usefulness in optical systems this glass is extremely hygroscopic and it is the essence of this invention to teach the obtaining of glasses of the above nature, namely glasses having low refractive index and optical dispersion, with improved chemical durability.

As set forth in Fig. I other compounds have been combined with beryllium fluoride in controlled proportions whereby a homogeneous melt may be obtained and which can be cooled to room temperature and reworked without loss of homogeneity.

Although, as shown in Fig. I, the index of refraction increases with the addition of sodium fluoride and sodium metaphosphate to the beryllium fluoride, several different indices of refraction and Nu values may be obtained by shifting the related proportions of the ingredients while increasing the durability of the glass.

By referring to the code set forth above, different characteristics of the melts listed in said Fig. I can be easily determined. It is to be understood that the melts set forth therein are only indicative of the varying characteristics which might be obtained and that by interpolation between specific batches set forth, an infinite variety of intermediate batch compositions can be derived with intermediate optical properties. It is believed that the various melts charted are readily determinable and that it is unnecessary to furnish any further disclosure of the related proportions of ingredients of said different melts.

The dash line A indicates the boundary of the field of useful glass compositions as to the sodium fluoride content and the dash line B indicates the boundary as to the upper limits of beryllium fluoride keeping in mind glass forming characteristics. From the chart, it is particularly pointed out that there is no upper limit to the sodium metaphosphate content for glass-forming characteristics but when the sodium metaphosphate content is above 80% the resultant glasses tend to be hygroscopic.

Although some of the glasses within the charted area are hygroscopic in nature and less durable than others set forth herein, they, however, may meet the requirements of particular uses, such as for optical elements which may be protected by imbedding them in a resin or by sealing them within a lens system, for use as cements, or other uses. Several interesting findings can be derived from study of the observations summarized in Fig. I as follows:

a. Chemical durability improves as NaF replaces $BeF_2$ and even more as $NaPO_3$ increases. There is an optimum in durability between 40 and 80% of $NaPO_3$.

b. Refractive index increases slowly as NaF replaces $BeF_2$ though at a progressively slower rate as $NaPO_3$ increases to about 70%. The most important factor in establishing refractive index level is $NaPO_3$ content. This can be shown to be a function of the ratio of fluorine to oxygen in the atomic formula method of expressing composition.

c. Nu values in general are higher as the $BeF_2$ content is increased and the $NaPO_3$ content is decreased and vice versa, but there are exceptions as evidenced by the chart. A minimum dispersion appears to exist around 30% $NaPO_3$ and a maximum around 80 to 90% $NaPO_3$.

d. Meltability is controlled by the proper balance of beryllium fluoride for each sodium metaphosphate level.

From the above triaxial diagram as set forth in Fig. I the percentage by weight of the various ingredients from which homogeneous glassy structures result are given as follows:

*Example A*

|  | Range of Percentages by Weight |
|---|---|
| Beryllium Fluoride ($BeF_2$) | Approximately 0 to 65. |
| Sodium Fluoride (NaF) | Approximately 0 to 40. |
| Sodium Metaphosphate ($NaPO_3$) | Approximately 10 to less than 100. |

The above gives the widest possible range.

A more practical range of the glasses illustrated in Fig. I from the standpoint of chemical durability is as follows:

*Example B*

|  | Range of Percentages by Weight |
|---|---|
| Beryllium Fluoride ($BeF_2$) | Approximately 10 to 40. |
| Sodium Fluoride (NaF) | Approximately 0 to 25. |
| Sodium Metaphosphate ($NaPO_3$) | Approximately 40 to 80. |

Some desirable specific batches are as follows:

*Example C*

|  | Approximate Percentages by Weight | | |
|---|---|---|---|
|  | Batch 1 | Batch 2 | Batch 3 |
| Beryllium Fluoride ($BeF_2$) | 30 | 40 | 10 |
| Sodium Fluoride (NaF) | 0 | 10 | 10 |
| Sodium Metaphosphate ($NaPO_3$) | 70 | 50 | 80 |
| Refractive Index ($N_D$) | 1.433 | 1.394 | 1.453 |
| Nu | 71 | 80 | 63 |
| Durability Rating | 2 | 2 | 2 |

The observations summarized in Fig. II teach as the widest possible range the following:

Example D

|  | Range of Percentages by Weight |
| --- | --- |
| Beryllium Fluoride ($BeF_2$) | Approximately 10 to 50. |
| Cryolite ($3NaF \cdot AlF_3$) | Approximately 0 to 40. |
| Sodium Metaphosphate ($NaPO_3$) | Approximately 10 to 90. |

A more practical range from the standpoint of chemical durability of the glasses illustrated in Fig. II is as follows:

Example E

|  | Range of Percentages by Weight |
| --- | --- |
| Beryllium Fluoride ($BeF_2$) | Approximately 10 to 50. |
| Cryolite ($3NaF \cdot AlF_3$) | Approximately 1 to 30. |
| Sodium Metaphosphate ($NaPO_3$) | Approximately 25 to 75. |

Specific examples of compositions in Fig. II which have produced satisfactory results are as follows:

Example F

|  | Approximate Percentages by Weight | | |
| --- | --- | --- | --- |
|  | Batch 1 | Batch 2 | Batch 3 |
| Beryllium Fluoride ($BeF_2$) | 40 | 20 | 10 |
| Cryolite ($NaF \cdot AlF_3$) | 20 | 10 | 10 |
| Sodium Metaphosphate ($NaPO_3$) | 40 | 70 | 70 |
| Refractive Index ($N_D$) | 1.382 | 1.442 | 1.44 |
| Nu | 78 | 66 | 77 |
| Durability Rating | 1 | 2— | 2— |

It will be noted from the three specific examples given that the same Nu value can be retained for widely different indices of refraction (1.38 to 1.44 at a Nu value of approximately 77) or, conversely, for a given refractive index varying Nu values can be obtained (namely, at $N_D=1.44$ Nu can vary from 66 to 77).

It will be noted in comparing Figs. I and II that the substitution of cryolite for sodium fluoride has broadened the field of glasses which can be obtained without devitrification and has improved chemical durability of corresponding glasses by a major degree. For example, certain corresponding compositions have been improved from a durability rating of 2 to a durability rating of 1 solely by the complete replacement of sodium fluoride by cryolite. Since cryolite is a combination of sodium fluoride and aluminum fluoride containing approximately 60% sodium fluoride by weight, these improvements have been obtained by the replacement of approximately 40% of the sodium fluoride content of the glasses of Fig. I by aluminum fluoride. Further improvements can be anticipated and have been realized by further lowering sodium fluoride through the use of sodium fluoride-aluminum fluoride compounds such as chiolite ($5NaF \cdot 3AlF_3$) which have a higher aluminum fluoride to sodium fluoride ratio than cryolite, or by the use of aluminum fluoride ($AlF_3 \cdot xH_2O$) in place of sodium fluoride.

Some examples of glasses which have been obtained at higher aluminum fluoride ratios are as follows:

Example G

|  | Approximate Percentages by Weight | | |
| --- | --- | --- | --- |
|  | Batch 1 | Batch 2 | Batch 3 |
| Beryllium Fluoride ($BeF_2$) | 40 | 35 | 50 |
| Sodium Fluoride (NaF) | 18 | 15 | 12 |
| Aluminum Fluoride ($AlF_3 \cdot xH_2O$) | 22 | 30 | 18 |
| Sodium Metaphosphate ($NaPO_3$) | 20 | 20 | 20 |
| Refractive Index ($N_D$) | 1.356 | 1.361 | 1.343 |
| Nu | 88 | 88 | 102 |
| Durability Rating | 2 | 2 | 3 |

Another way of increasing the aluminum content at the expense of the sodium content is by introducing the metaphosphate radical by means of aluminum metaphosphate rather than sodium metaphosphate. It has been found that when a minimum sodium content is maintained in the formula according to principles taught herein aluminum metaphosphate can completely replace sodium metaphosphate.

A wide range of desirable compositions have been found in the composition field described by a tetrahedron with sodium fluoride, beryllium fluoride, sodium metaphosphate, and aluminum metaphosphate at the four apices. Sections taken through this tetrahedron at 10 per cent steps in $BeF_2$ have shown that glasses form throughout most of the triangular sections from 60% to 10% $BeF_2$. At 60% and 50% $BeF_2$ almost all the glasses were hygroscopic. One exception was at 50% $BeF_2 + 20\%$ $NaPO_3 + 30\%$ $Al(PO_3)_3$ which had a durability rating of 2, $N_D=1.378$ and Nu=87. At 40% $BeF_2$ most glasses had durability ratings of 2, at 30% a few rated 1 and by 20% $BeF_2$ a large area of glass formation rated 1.

Selected examples from the numerous glasses prepared within the field are as follows:

Example H

|  | Approximate Percentages by Weight | | | | |
| --- | --- | --- | --- | --- | --- |
|  | Batch 1 | Batch 2 | Batch 3 | Batch 4 | Batch 5 |
| Beryllium Fluoride ($BeF_2$) | 40 | 30 | 20 | 10 | 30 |
| Sodium Fluoride (NaF) | 20 | 10 | 20 |  | 20 |
| Sodium Metaphosphate ($NaPO_3$) | 20 | 40 | 30 | 40 |  |
| Aluminum Metaphosphate $Al(PO_3)_3$ | 20 | 10 | 30 | 50 | 50 |
| Refractive Index ($N_D$) | 1.389 | 1.434 | 1.440 | 1.511 | 1.428 |
| Nu | 81 | 71 | 68 | 71 | 72 |
| Durability Rating | 2 | 1 | 1 | 1 | 1 |

Still another type of substitution which is possible is illustrated by Fig. III. In this case, aluminum silicofluoride has been used as an example of a possible substitution for sodium fluoride. Although aluminum silicofluoride is here given as a desirable ingredient, it has been found that other silicofluorides may similarly be incorporated in the glass melts, namely, the silicofluorides of sodium, calcium, zinc and the other substitutions for sodium. In terms of the atomic representation, these all come within the A group representing "hole-filling" cations.

Fig. III illustrates that aluminum silicofluoride can be incorporated into a homogeneous transparent glass and that such glasses can be obtained over an extraordinarily large range. The resulting glasses have a chemical durability rating of 1 over a large area and also exhibit relatively satisfactory melting behavior.

From the triaxial diagram set forth in Fig. III, the range of percentages by weight of the various ingredients from which homogeneous structures result are as follows:

Example I

|  | Range of Percentages by Weight |
| --- | --- |
| Beryllium Fluoride ($BeF_2$) | Approximately 0 to 70. |
| Aluminum Silicofluoride ($Al_2(SiF_6)_3$) | Approximately 0 to 70. |
| Sodium Metaphosphate ($NaPO_3$) | Approximately 10 to 90. |

A more practical range from the standpoint of chemical durability of the glasses illustrated in Fig. III is as follows:

Example J

| | Range of Percentages by Weight |
|---|---|
| Beryllium Fluoride (BeF$_2$) | Approximately 10 to 45. |
| Aluminum Silicofluoride (Al$_2$(SiF$_6$)$_3$). | Approximately 1 to 60. |
| Sodium Metaphosphate (NaPO$_3$) | Approximately 20 to 70. |

Specific examples of compositions which have produced satisfactory results are as follows:

Example K

| | Approximate Percentages by Weight | | |
|---|---|---|---|
| | Batch 1 | Batch 2 | Batch 3 |
| Beryllium Fluoride (BeF$_2$) | 30 | 40 | 20 |
| Aluminum Silicofluoride (Al$_2$(SiF$_6$)$_3$) | 50 | 10 | 10 |
| Sodium Metaphosphate (NaPO$_3$) | 20 | 50 | 70 |
| Refractive Index (N$_D$) | 1.394 | 1.400 | 1.447 |
| Nu | 74 | 76 | 64 |
| Durability Rating | 1 | 1 | 1 |

Briefly, again it can be seen that compositions of this type afford the advantage of being able to vary refractive index and Nu value independently.

Using any one of these specific compositions as a starting point, a further wide variety of substitutions is possible to modify the optical position of the resulting glass, to improve the melting and working characteristics, or to employ cheaper and more desirable ingredients. For example, it is desirable to keep the beryllium fluoride content at a minimum because of its high price, difficulty in handling, and volatility. In the examples set forth in Examples H and K above having a beryllium fluoride content of approximately 40%, it has been found possible to partially substitute aluminum fluoride for the beryllium fluoride, and also to partially or completely replace sodium metaphosphate by aluminum metaphosphate or other metaphosphates. This is illustrated in Example L:

Example L

| | Approximate Percentages by Weight | | |
|---|---|---|---|
| | Batch 1 | Batch 2 | Batch 3 |
| Beryllium Fluoride (BeF$_2$) | 40 | 50 | 50 |
| Aluminum Silicofluoride (Al$_2$(SiF$_6$)$_3$) | 40 | 30 | 30 |
| Sodium Metaphosphate (NaPO$_3$) | 10 | | |
| Aluminum Metaphosphate Al(PO$_3$)$_3$ | 10 | | |
| Magnesium Metaphosphate Mg(PO$_3$)$_2$ | | 20 | |
| Beryllium Metaphosphate Be(PO$_3$)$_2$ | | | 20 |
| Refractive Index (N$_D$) | 1.368 | 1.358 | 1.349 |
| Nu | 74 | 71 | 74 |
| Durability Rating | 1 | 1+ | 4 |

A particularly interesting type of substitution is that in which the sodium metaphosphate is replaced not only by other metaphosphates but by salts supplying other radicals in place of the metaphosphate radical, for example, carbonate (CO$_3$)$^{2-}$, nitrate (NO$_3$)$^{1-}$, sulphate (SO$_4$)$^{2-}$ and the like. In certain cases, it has even been found possible to introduce the hydroxyl anion (OH)$^-$. In all of these cases, sodium has been used as the cation constituents of the salt but has been found to be replaceable by calcium, potassium, zinc and the other A group elements. Starting from the parent glass: 40% beryllium fluoride + 40% cryolite + 20% sodium metaphosphate, some specific examples of the above substitutions are:

Example M

| | Approximate Percentages by Weight | | | | | | |
|---|---|---|---|---|---|---|---|
| | Batch 1 | Batch 2 | Batch 3 | Batch 4 | Batch 5 | Batch 6 | Batch 7 |
| Beryllium Fluoride (BeF$_2$) | 40 | 40 | 40 | 40 | 40 | 40 | 40 |
| Cryolite (3NaF.AlF$_3$) | 40 | 40 | 30 | 40 | 20 | 30 | 40 |
| Sodium Metaphosphate (NaPO$_3$) | 20 | 10 | 20 | 10 | 20 | 20 | 10 |
| Sodium Nitrate (NaNO$_3$) | | 10 | | | | | |
| Sodium Sulphate (Na$_2$SO$_4$) | | | 10 | | | | |
| Sodium Carbonate (Na$_2$CO$_3$) | | | | 10 | | | |
| Sodium Hydroxide (NaOH) | | | | | 20 | | |
| Aluminum Sulphate Al$_2$(SO$_4$)$_3$ | | | | | | 10 | |
| | | | | | | | 10 |
| Refractive Index (N$_D$) | 1.350 | 1.340 | 1.356 | 1.338 | 1.361 | 1.360 | 1.343 |
| Nu | 81 | 78 | 73 | 78 | 74 | 73 | 74 |
| Durability Rating | 3 | 2 | 3− | 2− | 2− | 1 | 2 |

In the case of all of the specific examples set forth above, it is possible to restate the composition in terms of the generalized formula: $A_mB_n(O_xF_{1-x})$. For illustrational purposes, glasses which have been referred to above may be represented as follows:

Example N

| Examples | Atomic Proportions | N$_D$ |
|---|---|---|
| C—Batch 1 | Na$_{0.20}$(Be$_{0.19}$P$_{0.20}$)$_{0.39}$(O$_{0.61}$F$_{0.39}$) | 1.43 |
| C—Batch 2 | Na$_{0.21}$(Be$_{0.25}$P$_{0.15}$)$_{0.40}$(O$_{0.43}$F$_{0.57}$) | 1.39 |
| F—Batch 1 | Na$_{0.20}$(Be$_{0.24}$Al$_{0.03}$P$_{0.11}$)$_{0.38}$(O$_{0.34}$F$_{0.66}$) | 1.38 |
| F—Batch 2 | Na$_{0.32}$(Be$_{0.07}$Al$_{0.03}$P$_{0.23}$)$_{0.33}$(O$_{0.68}$F$_{0.32}$) | 1.44 |
| G—Batch 3 | Na$_{0.13}$(Be$_{0.29}$Al$_{0.06}$P$_{0.05}$)$_{0.41}$(O$_{0.15}$F$_{0.85}$) | 1.34 |
| H—Batch 5 | Na$_{0.14}$(Be$_{0.19}$Al$_{0.06}$P$_{0.16}$)$_{0.41}$(O$_{0.49}$F$_{0.51}$) | 1.43 |
| F—Batch 1 | Na$_{0.05}$(Be$_{0.17}$Al$_{0.06}$Si$_{0.03}$P$_{0.05}$)$_{0.36}$(O$_{0.16}$F$_{0.84}$) | 1.39 |
| L—Batch 2 | Mg$_{0.03}$(Be$_{0.27}$Al$_{0.03}$Si$_{0.05}$P$_{0.05}$)$_{0.41}$(O$_{0.17}$F$_{0.83}$) | 1.36 |
| M—Batch 1 | Na$_{0.22}$(Be$_{0.25}$Al$_{0.03}$Si$_{0.05}$P$_{0.06}$)$_{0.41}$(O$_{0.17}$F$_{0.83}$) | 1.35 |
| M—Batch 4 | Na$_{0.25}$(Be$_{0.25}$Al$_{0.06}$C$_{0.03}$P$_{0.03}$)$_{0.37}$(O$_{0.16}$F$_{0.83}$) | 1.34 |

From the above specific formulas, it is possible to derive some generalizations about the relative amounts of the cations which can be introduced and still obtain glasses, and also the range within which the amounts of A cations can be varied relative to the B cations and to (O+F); also, the extent to which other elements can be introduced for the beryllium and phosphorus in the B group. Thus $m$ could vary from about .03 to .32, $n$ from about .33 to .41 and $x$ from about .15 to .68. It also becomes clear that it is the relative proportion of fluorine to oxygen which controls the refractive index level. The higher the fluorine fraction, the lower the refractive index.

It is to be noted that the fraction of sodium (Na) varies over a wide range and in certain cases may be omitted entirely. Sodium is quoted in nearly all the examples but glasses have been prepared where the sodium has been replaced by any of the A group enumerated above. Example L illustrates an instance where magnesium (Mg) completely replaces sodium. Among the B group cations it is to be noted that aluminum (Al), phosphorus (P), silicon (Si) and carbon (C) replace beryllium in relatively small fractions but it has been found that even these minor substitutions play an important role in improving the chemical durability and meltability. In arriving at these substitutions it has been found helpful to evaluate the possibilities from the standpoint of the "ionic potentials" of the element concerned and the cation derived from it. The ionic potential is established by dividing the valence of a cation by its ionic radius. It can be seen that the smaller the radius and the larger the valence, the higher is the ionic potential, and high ionic potential has been found to favor a strong structure with good chemical durability, increased hardness and other desirable properties.

Other examples of high ionic potential cations are zirconium and titanium. Zirconium fluoride has been introduced into glasses of this type by means of the double salt sodium zirconium fluoride. An example of a composition containing this zirconium fluoride is as follows: Beryllium fluoride ($BeF_2$) 40% by weight, aluminum fluoride 16%, sodium fluoride 19%, zirconium fluoride 5% and sodium metaphosphate 20%. The resulting glass has a refractive index of 1.364 and Nu value of 94 and had an excellent durability rated at 1 whereas the parent glass before the introduction of the zirconium fluoride had a durability rating of 3.

An example of a glass containing titanium fluoride is as follows (the titanium is introduced by means of potassium titanium fluoride with an assay of 92.6%): beryllium fluoride ($BeF_2$) 30%, potassium fluoride (KF) 20%, silicon tetrafluoride ($SiF_4$) 10%, titanium tetrafluoride ($TiF_4$) 10% and potassium metaphosphate ($KPO_3$) 30%. The resulting glass had a refractive index of 1.397, Nu of 71, and a durability rating of 2 compared to the parent glass which contained approximately 20% silicon fluoride and no titanium fluoride which had a lower refractive index of 1.357, a Nu of 84 and was extremely hygroscopic (or durability rating 4+).

Glasses of this unusual type require the use of some relatively novel raw materials for glass making. Beryllium fluoride is available in the form of lumps of high purity beryllium fluoride glass from manufacturers of beryllium chemicals. It has also been obtained in a less pure powdered form. Cryolite ($3NaF.AlF_3$) is available either as the natural Greenland mineral or as synthetic cryolite from aluminum producers. Aluminum fluoride is also available as generally as the hydrate with varying amounts of water ($AlF_3.xH_2O$) assaying as low as 55%. It is desirable to calcine this material at about 1900° F. shortly before weighing it. Other fluorides such as those of sodium, potassium, magnesium, and calcium are generally available. There are some advantages in using the alkali acid fluorides such as $KHF_2$ because they are less hygroscopic than the normal fluorides and offer a more favorable fluorine to alkali ratio. Silicofluorides (also called fluosilicates) have recently become available in tonnage quantities in the full range of the salts of the A group cations.

As source of a carbon we have found the carbonates advantageous; for example, sodium carbonate ($Na_2CO_3$) and calcium carbonate ($CaCO_3$). The metaphosphates are also commercially available. As sources of zirconium fluoride and titanium fluoride, the double salts of sodium (potassium) zirconium chloride and potassium titanium fluoride have been found useful.

The choice of a refractory to hold this type of melt depends on how high the fluorine content is compared to the phosphate. At the highest fluorine contents platinum seemed most desirable and was not attacked directly by the melts, but it was found that care had to be taken not to let metallic iron or other metals from alloys come in contact with platinum and the melt as the metal was fluxed by the fluoride-phosphate and in turn attacked the platinum. Fused silica crucibles, graphite and carbon are also practical.

In the high phosphate range ordinary ceramic crucibles (aluminum silicates) have been found to be satisfactory, and in some cases even preferable to platinum.

The choice of melting cycle is also determined by the relative amounts of fluorine and oxygen, that is of fluorides and metaphosphates. Most of these compositions, however, could be melted between 1600 and 1900° F.

The higher fluorine glasses fumed considerably during this melting stage particularly if the raw materials are damp or contain water of constitution; therefore, the time at this upper melting temperature should be kept as short as possible and for experimental melts of 50 to 250 grams about 5 minutes was ordinarily adequate for complete melting. The lower fluorine glasses are less critical and may be held for longer periods in the melting range. The furnace temperature should then be lowered as rapidly as possible to about 1200° F., depending upon the viscosity and the devitrification tendency of the particular formula, and the melt held at that temperature for about a half an hour or long enough to permit it to calm down and get rid of its fuming and bubbles. Certain of the compositions could be held at temperatures as low as 850° F. without devitrifying and still poured fluidly. Because of the fuming and the extremely fluid nature of these glasses they tend to be quite striated and it is necessary to stir them at the lower temperature. The melts can be poured into graphite or graphitized iron moulds and then annealed. Because of the wide range of compositions taught no specific annealing temperature can be mentioned although 450° F. has been found satisfactory for most of the more desirable formulas. After annealing to release strain and cooling slowly at room temperature, glasses are obtained which can be ground and polished and otherwise handled like conventional glasses. They do possess the extraordinary property of being workable at extremely low temperatures, intermediate between the working temperature of normal glasses and organic plastics. The glasses with higher fluorine ratios (fluorine refractive of 0.50 or higher) have been worked by pressing at temperatures as low as 600° F. Glasses with a durability rating of 3 or 4 can be polished by conventional means but it has been found helpful to use a solution of ethylene glycol and water as the liquid suspending the rouge.

These glasses exhibit other unusual properties such as extremely high thermal expansion, low softening temperatures and unusual transmissions in the ultra-violet and infra-red regions.

Therefore, from the above teachings, various types of homogeneous structures and specific glass-forming compositions can be produced which permit control of the melting and working properties, control over the chemical durability and control over the optical position both as to the refractive index level and the relationship between refractive index and dispersion.

This has been accomplished as stated by combining controlled amounts of fluorine and oxygen in varying ratios as anions and selected positive elements as cations in controlled related proportions depending upon the resultant characteristics desired.

The batch formulas, final analysis, percentages, etc. given above are by way of illustration only and should not be limitive of the invention except in so far as they are specifically recited in the appending claims.

From the foregoing, it will be seen that I have produced means and method of a simple and efficient nature that will produce all of the objects and advantages of the present invention.

Having described my invention, I claim:

1. A homogeneous fused structure comprising the sodium, beryllium, aluminum, phosphorous, oxygen and fluorine atoms resulting from a batch containing beryllium fluoride ($BeF_2$) from approximately 10 to 50% by weight, cryolite ($3NaF.AlF_3$) from near 0 to approximately 40% by weight, and sodium metaphosphate ($NaPO_3$) from approximately 10 to 90% by weight.

2. A homogeneous structure comprising the fused product of beryllium fluoride ($BeF_2$) from approximately 10 to 50% by weight, cryolite ($3NaF.AlF_3$) from approximately 1 to 30% by weight, and sodium metaphosphate ($NaPO_3$) from approximately 25 to 75% by weight.

3. A homogeneous structure comprising the fused product of approximately 40% by weight of beryllium fluoride (BeF₂), approximately 20% by weight of cryolite (3NaF.AlF₃), and approximately 40% by weight of sodium metaphosphate (NaPO₃), said structure having a refractive index of approximately 1.382, and a Nu value of approximately 78.

4. A homogeneous structure comprising the fused product of approximately 20% by weight of beryllium fluoride (BeF₂), approximately 10% by weight of cryolite (3NaF.AlF₃), approximately 70% by weight of sodium metaphosphate (NaPO₃, said structure having a refractive index of approximately 1.442, and a Nu value of approximately 66.

5. A homogeneous structure comprising the fused product of approximately 10% by weight of beryllium fluoride (BeF₂), approximately 20% by weight of cryolite (3NaF.AlF₃), approximately 70% by weight of sodium metaphosphate (NaPO₃), said structure having a refractive index of approximately 1.44 and a Nu value of approximately 77.

6. A homogeneous structure comprising the fused product of approximately 40% by weight of beryllium fluoride (BeF₂), approximately 18% by weight of sodium fluoride (NaF), approximately 22% by weight of calcined aluminum fluoride, approximately 20% by weight of sodium metaphosphate (NaPO₃), said structure having a refractive index of approximately 1.356, and a Nu value of approximately 88.

7. A homogeneous structure comprising the fused product of approximately 35% by weight of beryllium fluoride (BeF₂), approximately 15% by weight of sodium fluoride (NaF), approximately 30% by weight of calcined aluminum fluoride, and approximately 20% by weight of sodium metaphosphate (NaPO₃), said structure having a refractive index of approximately 1.361, and a Nu value of approximately 88.

8. A homogeneous structure comprising the fused product of approximately 50% by weight of beryllium fluoride (BeF₂), approximately 12% by weight of sodium fluoride (NaF), approximately 18% by weight of calcined aluminum fluoride, and approximately 20% by weight of sodium metaphosphate (NaPO₃), said structure having a refractive index of approximately 1.343, and a Nu value of approximately 102.

9. A homogeneous structure comprising the fused product of approximately 40% by weight of beryllium fluoride (BeF₂), approximately from 20 to 40% by weight of cryolite (3NaF.AlF₃), approximately from 10 to 20% by weight of sodium metaphosphate (NaPO₃), and from near 0 to approximately 20% by weight of an ingredient selected from the group consisting of sodium nitrate (NaNO₃), sodium sulphate (Na₂SO₄), sodium carbonate (Na₂CO₃), sodium hydroxide (NaOH), and mixtures thereof, said structure having a refractive index of approximately from 1.338 to 1.361, and a Nu value of approximately from 73 to 81.

10. A fluoroxide optical glass having an atomic formula expressed as $A_mB_n(O_xF_{1-x})$ in which A represents metals selected from the group consisting of sodium, potassium, lithium, rubidium, caesium, magnesium, calcium, barium, strontium, zinc, cadmium, lead, thallium and mixtures thereof, B atoms selected from the group consisting of beryllium, aluminum, silicon, phosphorous, boron, sulphur, nitrogen, carbon, titanium, zirconium and mixtures thereof, O oxygen atoms and F fluorine atoms, with the sum of O and F being unity and $x$, $m$ and $n$ representing the number of atoms to which they are subscripted with relation to the sum of O and F, $x$ having a value between about .15 and .68, $m$ between about .03 and .32 and $n$ between about .33 and .41.

11. A fluoroxide optical glass having an atomic formula expressed as $A_mB_n(O_xF_{1-x})$ in which A represents metal atoms selected from the group consisting of sodium, potassium, lithium, rubidium, caesium, magnesium, calcium, barium, strontium, zinc, cadmium, lead, thallium and mixtures thereof, B polyvalent atoms selected from the group consisting of beryllium, aluminum, silicon, phosphorous, boron, sulphur, nitrogen, carbon, titanium, zirconium and mixtures thereof, O oxygen atoms and F fluorine atoms, with the sum of O and F being unity and $x$, $m$ and $n$ representing the number of atoms to which they are subscripted relative to the sum of O and F, the value of $n$ being in the neighborhood of .4, the value of $m$ ranging between about .03 and .32 and the value of $x$ ranging between about .15 and .68.

References Cited in the file of this patent

UNITED STATES PATENTS 2,481,700    Sun et al. _____ Sept. 13, 1949